Patented Feb. 5, 1929.

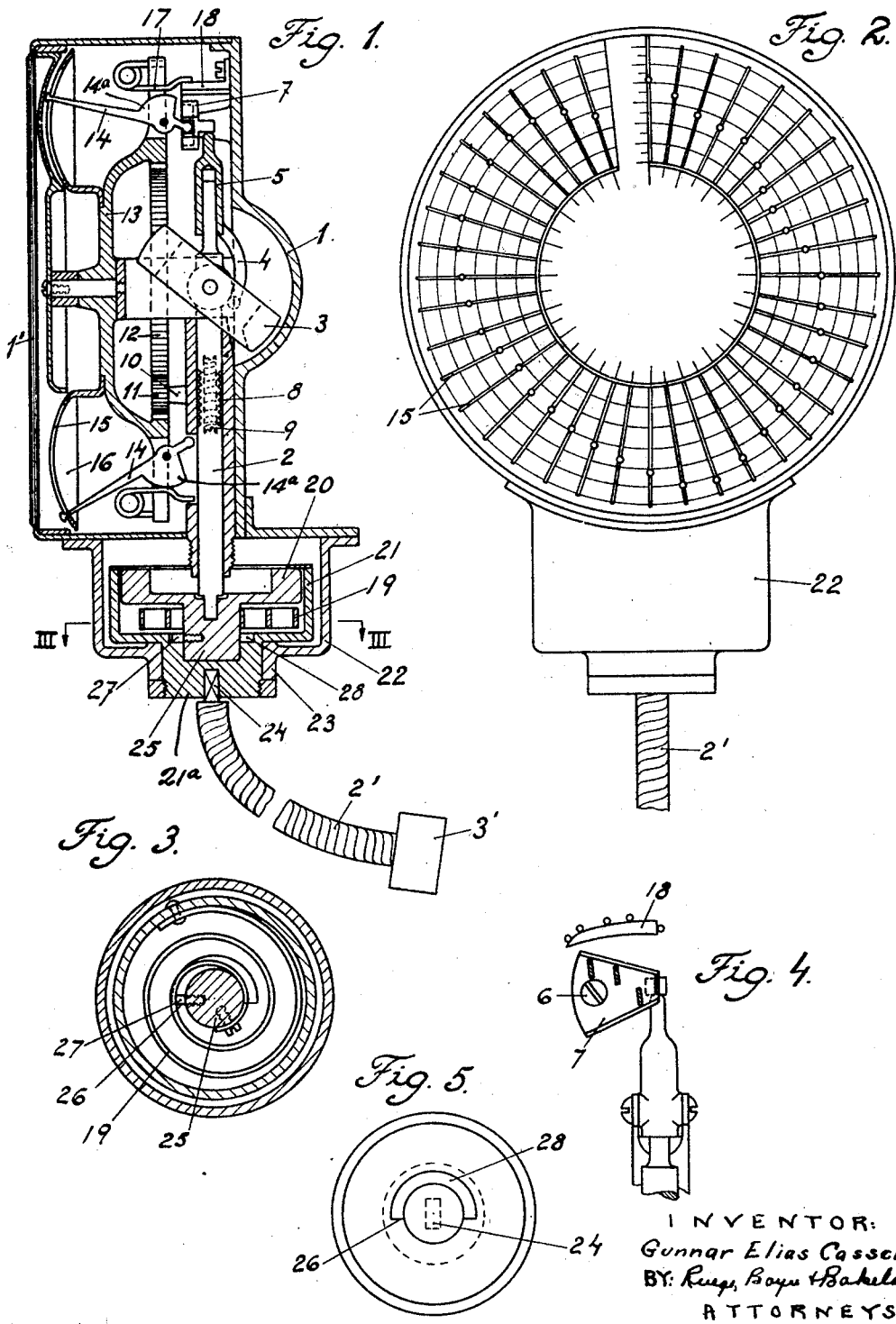

1,700,881

UNITED STATES PATENT OFFICE.

GUNNAR ELIAS CASSEL, OF STOCKHOLM, SWEDEN, ASSIGNOR TO ARTHUR LEFFLER, OF DJURSHOLM, STOCKHOLM, SWEDEN.

MOTION-EQUALIZING DEVICE.

Application filed June 22, 1927, Serial No. 200,749, and in Sweden November 7, 1925.

This invention relates to devices for transmitting motion between two members intended to be rotated in synchronism with each other and at varying speeds of rotation.

In the transmission of rotary motion from a driving member, such, for instance, as the roadwheel of an automobile or other motor driving vehicle, to a driven member or instrument for recording the speed of the driving member, it is frequently necessary to employ a flexible shaft as the motion transmitting medium. Inasmuch, however, as such flexible shafts usually have to be curved or distorted, sometimes in more than one direction, it has been found that the motion produced in the driven member as a result of the contortions of the flexible shaft is considerably changed and irregular as compared with that of the driving member. The principal object of the present invention, therefore, is to provide means for correcting or offsetting the irregularities of rotation of the flexible shaft, whereby the rotation of the driven member will be approximately synchronous with that of the driving member.

With the foregoing and other objects in view, which will appear as the description proceeds, the invention consists in the novel features of construction and combination of parts which will be more fully described hereinafter and particularly pointed out in the claims.

In the drawings accompanying and forming part of this specification,

Fig. 1 is a vertical sectional view of an apparatus embodying the present invention;

Fig. 2 is a diagrammatic front view of the apparatus;

Fig. 3 is a transverse sectional view taken on the line III—III of Fig. 1; and

Figs. 4 and 5 are detail views of portions of the apparatus.

The same characters of reference designate the same parts in the different figures of the drawings.

Referring to the drawings, 1 designates the casing of the apparatus, said casing having a glass front plate 1′. Adjacent to the rear wall of the casing, a shaft 2 is supported for rotation, said shaft being adapted to receive motion from a flexible shaft 2′ having a coupling member 3′ for connection with a driving member, such, for instance, as the roadwheel of an automobile or other motor driven vehicle. The shaft 2 carries a pivoted centrifugal weight 3 normally disposed in oblique position relative to the shaft, said weight being connected by a link 4 to a vertically movable sleeve 5 supported on the upper end of shaft 2. Immediately above the sleeve 5, a tapered channel-shaped guide member 7 is supported on a pivot 6 (Fig. 4) secured in a fixed portion of the casing, said guide member having a rearwardly projecting lug disposed so as to rest on the upper end of the sleeve 5, whereby upward movement of said sleeve will swing the guide member on its pivot. The shaft 2 is provided at one portion thereof with a worm 8 in engagement with a worm wheel 9 carried by a countershaft 10 mounted for rotation in the casing, and which countershaft carries at its opposite end a pinion 11 in mesh with an internally toothed rim 12 carried by a wheel 13 mounted for rotation in the casing. The wheel 13 is provided adjacent to its periphery with a plurality of radially extending slots, in each of which is pivotally mounted a lever 14 having a comparatively long arm extending toward the front of the casing and entering a radial slot 15 formed in a dial plate 16 secured to the wheel 13 for rotation therewith. As shown in Fig. 2, said dial plate is marked off on its front face with a plurality of concentric lines intersecting the slots 15 thereby dividing the area of the front surface of the plate into a plurality of comparatively small spaces corresponding to different speeds of rotation of the wheel 13. Each of the levers 14 has a rearwardly extending, shorter arm adapted to pass through the channel of the guide member 7 during rotation of the wheel 13. In order to retain the levers in their initial position until they enter the guide member 7, each lever is provided with a segmental portion 14ᵃ concentric with its pivot, the curved edge of which portion is normally engaged by a spring 17 secured in the wheel 13. Means is provided for releasing the lever from the tension of said spring during the passage of the lever arm through the guide member 7, for which purpose the spring 17 is elongated beyond its contact with the lever segment 14ᵃ and a cam bracket 18 is secured to the casing wall above the guide member 7, the leading end of the cam being so disposed that the elongated end of the spring will ride thereon, thus relieving the pressure on the lever while the latter is in engagement with the guide member 7, so that the lever is entirely free to be operated by said guide member.

In the present instance, the shaft 2 is secured at its lower end in the hub 25 of a flywheel 20, which is supported for rotation in a drum 21, the latter being in turn provided with a boss 21ª mounted for rotation in a bearing 23 carried by a casing 22, which casing is provided at its upper end with a flange by means of which it may be secured to the casing 1. The flexible shaft 2' is provided with a squared pin 24 which engages a similarly shaped recess in the boss 21ª of the drum 21, whereby the latter is rotated with the flexible shaft. Between the hub 25 of the flywheel 20 and the drum 21, a spring 19 is provided, the inner end of said spring being secured to the hub 25 and its outer end to the drum 21. The hub 25 is further provided with a pin 27 extending radially therefrom into a recess 28 in the boss 21ª, said recess extending approximately halfway around the hub 25, whereby the members 20 and 21 are capable of a certain amount of rotation relatively to each other.

The operation of the device above described is as follows: The flexible shaft 2' is connected by the coupling member 3' to a rotating member so that said flexible shaft will be rotated with said rotating or driving member. The rotation of shaft 2' will cause the drum 21 to rotate, thus tending to wind the spring 19 from its outer toward its inner coil, and as the spring 19 ordinarily possesses a certain initial tension, when the device is inoperative the pin 27 abuts against one end wall of the recess 28, as shown in Fig. 3. It is, however, free to oscillate in the recess 28 during operation of the device, so that any inequalities in the speed of rotation of the members 21 and 25 are compensated for. Inasmuch as the inner end of the spring is secured to the hub 25 of the flywheel, the winding of the spring will cause the flywheel to rotate, and with it the shaft 2, whereupon motion will be transmitted to the wheel 13 by means of worm gearing 8, 9, shaft 10, and gearing 11, 12, The levers 14 carried by the wheel 13 are initially in the zero position shown at the lower portion of Fig. 1, the levers being held in said position by the pressure of the spring 17 on the portion 14ª. Upon rotation of the wheel, however, the short arm of each successive lever, as it arrives at the position shown at the upper portion of Fig. 1, enters the wider end of the guide 7, while the elongated end of its companion spring 17 engages the upper surface of the cam 18 and is thus raised out of contact with the lever, as indicated in Fig. 4, so that the lever is free to swing on its pivot according to the position of the guide member. When, on the continued rotation of the wheel 13, the lever arm emerges from the narrower end of the guide member, its companion spring 17 will at the same moment pass from the cam 18 and drop into contact with the portion 14ª and will thus maintain the lever in that position until it again arrives at the guide member 7. It will readily be understood that as the shaft 2 rotates faster and faster the weight 3 will, owing to centrifugal force, swing more and more nearly into horizontal position, whereby the arm 4 will cause the sleeve 5 to rise, thereby swinging the guide member 7 on its pivot and raising the narrower end thereof, and with it the short arm of the lever 14, whereby the longer arm of said lever is caused to move proportionately in the slot 15 toward the center of rotation of the dial 16. It will thus be seen that when the wheel 13 has completed one revolution the positions of the levers in their respective slots will be a true record of the varying speeds of rotation of the shaft 2 during such revolution.

As hereinbefore stated, if the flexible shaft 2' were directly connected with the shaft 2, owing to the contortions of the flexible shaft during rotation, the record shown by the levers could not be depended upon as a true record of the speed of rotation of the driving member, because such contortions are governed by any variable resistance that may arise in the apparatus. By the intervention of the spring 19 and flywheel 20, however, any irregularities of movement of the flexible shaft are taken up and compensated for. In other words, at the beginning of the rotation of the flexible shaft a certain amount of energy will be stored in the spring 19, so that when the flywheel 20 has been set in motion it will overcome any unequal resistance and thus render the motion of the driven member approximately synchronous with that of the driving member.

While I have described in detail the device herein illustrated, it is to be understood that I do not thereby limit my invention to the precise features of construction shown, as I am aware that many mechanical changes and modifications may be made therein without departing from the spirit and scope of the invention, as set forth in the appended claims.

Having thus described my invention, what I claim is:

1. A device of the character described, comprising, in combination, a flexible shaft adapted to receive motion from a driving member rotatable at varing speeds, a speed-indicating instrument, an elastic means for transmittitng motion from said flexible shaft to said instrument, said elastic means being adapted to absorb irregularities of rotation of the flexible shaft whereby the motion received by the instrument is approximately synchronous with that of the driving member.

2. A device of the character described, comprising, in combination, a flexible shaft adapted to receive motion from a driving member rotatable at varying speeds, a speed-indicating instrument, a rigid shaft and gearing for rotating said instrument, a flywheel connected to said rigid shaft for rotation therewith, a spring connecting said flywheel with said flexible shaft, and cooperating means carried by said flywheel and flexible shaft for permitting oscillatory movement of one of said members relative to the other.

In testimony whereof I have signed my name to this specification.

GUNNAR ELIAS CASSEL.